Patented Aug. 20, 1929.

1,725,359

UNITED STATES PATENT OFFICE.

ANTON LEDERER, OF VIENNA, AUSTRIA.

PROCESS OF MANUFACTURING CARBON.

No Drawing. Original application filed August 14, 1925, Serial No. 50,281, and in Austria April 24, 1925. Divided and this application filed October 7, 1926. Serial No. 140,217.

This invention relates to a process of manufacturing carbon suitable for use as filaments in incandescent electric lamps and the like, and has for its object generally the provision of a process which is efficient, economical, and lends itself readily to factory production.

This application . a division of my co-pending application Serial No. 50,281, filed August 14, 1925, which latter application relates to improvements in the process set forth in my co-pending application Serial No. 692,617, filed February 13, 1924.

Other objects of the invention will in part be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

Although carbon and its compounds have been known for a long time, no absolutely clear knowledge of the nature of carbon has been attained beyond that relating to the well defined organic compounds. And although during the last few years much research work has been done in this direction, the statements which are available are somewhat contradictory. In general, however, three modifications of carbon are described, namely, diamond, graphite and amorphous carbon.

The so-called amorphous carbon is not, in the true sense of the word, chemically pure carbon. It contains as a rule certain impurities, particularly gaseous impurities, such as hydrogen, nitrogen and oxygen; in consequence it can never be stated with certainty whether we have carbon in the true sense of the word or a material of high carbon content. To this group of amorphous carbon belong the carbon filaments known and used until the present, and produced according to the well-known collodion process. The carbon for such filaments was derived from relatively complex molecules, and contained a relatively high percentage of impurities, such as hydrogen, nitrogen, oxygen, etc., and was by no means as dense or as stable as a crystal. Also the filaments produced from soot with binding agents, such as tar and the like, are to be regarded as amorphous carbon. Therefore the view that the carbon filaments for incandescent electric lamps produced so far are not to be looked upon as pure carbon is well justified. From the present state of the art, one may conclude that the graphite modification of carbon is the most stable form of carbon except the diamond and is generally the purest form in respect to chemical behavior, particularly when graphite obtained from simple compounds is taken as the source.

Under certain circumstances, it is found that the separated carbon when brought into the form of a solid solution, particularly if it already contains certain crystals or crystal nucleii, will set up a crystalline growth. This phenomenon is not unknown in other substances; for example, it has been observed that if in certain salt solutions, e. g., in a supersaturated solution of common salt, a small crystal of common salt is introduced, it will begin to grow, so that in this manner a big common salt crystal may be obtained. In general it may be observed that the substance which it is intended to crystallize must have the possibility of dissolving itself. Large quantities of solvent are to be avoided; a small quantity which is just sufficient to effect solution is proper. This solution may be effected in the case of carbon with the aid of a metal such as iron and chromium when subjected to the proper temperatures. If this condition be kept in mind, it is not surprising that the crystal nucleii or crystals contained in the carbon used will, with the use of a proper solvent and a proper temperature, begin to grow. The carbon used for this purpose, however, should be of a high degree of purity.

It is well known that carbon as such can easily be obtained from various carbon-containing compounds. It is known also that by the incomplete combustion of illuminating gas, or of vegetable, of mineral oils, and of acetylene, carbon may be separated; this carbon, however, is classed among the species of amorphous carbon, and is generally designated "soot" or "lampblack". Such species of carbon are not suitable for the process of this invention, primarily because it is not pure carbon. A suitable form of carbon may be obtained from compounds which have been selected so as to insure that the resulting product will be substantially unadulterated. The product need not be crystalline, but preferably does contain crystals or crystal nucleii which, under proper circumstances, will agglomerate into larger crystal bodies.

Simple compounds of carbon which do not contain hydrogen, nitrogen or oxygen and are volatile are, on the whole, the most suitable, for example carbon bisulphide ($CS_2$), carbon tetrachloride ($CCl_4$), carbon hexachloride ($CCl_6$).

By vaporizing such a carbon compound and passing the vapor through a glowing tube (heated to about 700–800° C.), substantially no change will take place in the vapor, the vapor passing through the tube as it is. A small dark deposit may at times be formed at some cooler spot, but it is possible to recondense the vapor into the original body; for example, in the case of carbon bisulphide, back into the original liquid.

A reaction, however, can be made to take place in the glowing tube, if certain bodies in the nature of catalysts are introduced, for example, pure carbon, charcoal, or compressed graphite, also certain metals, as copper; over which bodies the vapor is made to pass. The decomposition of the vapor, so passed, will begin to be observed after some little time, the action taking place at plates which are specially provided for the purpose. As the action progresses, the plates become covered with a deposit which may be increased by continuing the process. It appears that there is not only a thermo-chemical action taking place in this process of depositing, but some localized action is also involved (i. e., chemical action in situ) which may be designated a "topo-chemical action".

Thus a deposit is obtained upon the plates introduced into the tube, considerable quantities of deposit being obtainable if the process is carried on for sufficient time. This deposit consists chiefly of carbon but generally contains some impurities, which in the case where carbon bisulphide is used, comprises sulphur. Such sulphur, however, is apparently not chemically bound in the carbon body, since, if this body be heated in a vacuum, pure carbon is obtained without any further trace of impurities; this sulphur follows the law that free sulphur can be readily expelled in the form of a vapor, and can be later condensed at a cool spot. The carbon thus obtained is a very fine grey powder, which may be easily compressed and, by passing through a suitable press or rollers, can be readily agglomerated into large scales which are ductile and have the appearance of lead.

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent, is:

1. The process of producing substantially pure carbon in a finely divided state, which comprises causing a vapor of a simple volatile compound of carbon with an element having an atomic weight at least as great as 32 to pass into a heated zone, heating said vapor to a temperature of at least 700 degrees C. whereby to effect the direct decomposition of said vapor, and collecting the carbon deposit from said reaction upon plates in a cooler zone.

2. The process of producing substantially pure carbon in a finely divided state, which comprises passing a vapor of a carbon compound with sulphur into a heated zone, heating the same to a temperature of at least 700 degrees C. whereby to cause the direct decomposition of said vapor in the presence of a catalyst, and collecting the carbon deposit resulting from said reaction upon plates in a cooler zone.

3. The process of producing substantially pure carbon in a finely divided state, which comprises passing a vapor of carbon bisulphide into a heated zone, heating said vapor to a temperature of at least 700 degrees C. whereby the direct decomposition of said vapor is effected in the presence of a catalyst comprising glowing bodies of substantially pure carbon, and collecting carbon deposit resulting from said reaction upon plates in a cooler zone.

4. The process of producing substantially pure carbon in a finely divided state, which comprises passing a vapor of carbon bisulphide into a heated zone, heating said vapor to a temperature of at least 700 degrees C. whereby the direct decomposition of said vapor is effected in the presence of a catalyst comprising glowing bodies of substantially pure carbon, collecting carbon deposit resulting from said reaction upon plates in a cooler zone, and subsequently purifying the carbon collected from said plates by heating the same in a vacuum.

In testimony whereof I affix my signature.

ANTON LEDERER.